(12) United States Patent
Ben Salah et al.

(10) Patent No.: US 11,156,562 B2
(45) Date of Patent: Oct. 26, 2021

(54) METHOD FOR DETERMINING THE DEGREE OF COVERAGE OF A METAL PART HAVING UNDERGONE A TREATMENT MODIFYING THE SURFACE ROUGHNESS OF SAID PART

(71) Applicant: SAFRAN, Paris (FR)

(72) Inventors: Nihad Ben Salah, Moissy-Cramayel (FR); Jawad Badreddine, Moissy-Cramayel (FR)

(73) Assignee: SAFRAN, Paris (FR)

( * ) Notice: Subject to any disclaimer, the term of this patent is extended or adjusted under 35 U.S.C. 154(b) by 96 days.

(21) Appl. No.: 16/500,376

(22) PCT Filed: Apr. 5, 2018

(86) PCT No.: PCT/EP2018/058754
§ 371 (c)(1),
(2) Date: Oct. 2, 2019

(87) PCT Pub. No.: WO2018/185234
PCT Pub. Date: Oct. 11, 2018

(65) Prior Publication Data
US 2021/0131975 A1    May 6, 2021

(30) Foreign Application Priority Data

Apr. 5, 2017    (FR) ...................... 1752958

(51) Int. Cl.
*G01N 21/88*  (2006.01)
*C21D 7/06*  (2006.01)
(Continued)

(52) U.S. Cl.
CPC ........... *G01N 21/8803* (2013.01); *C21D 7/06* (2013.01); *G01N 21/25* (2013.01); *G01N 21/274* (2013.01); *G01N 21/47* (2013.01)

(58) Field of Classification Search
CPC .. G01N 21/8803; G01N 21/25; G01N 21/274; G01N 21/47; C21D 7/06
See application file for complete search history.

(56) References Cited

U.S. PATENT DOCUMENTS

| 3,950,642 A | * | 4/1976 | Feld ......................... | C21D 7/06 250/302 |
| 2013/0208285 A1 | * | 8/2013 | Miettinen .............. | G01B 11/30 356/600 |
| 2014/0166160 A1 | * | 6/2014 | Prezeau ................... | C23C 8/76 148/218 |

FOREIGN PATENT DOCUMENTS

| GB | 1468008 A | 3/1977 |
| JP | 2011-152603 A | 8/2011 |
| JP | 2015-160282 A | 9/2015 |

OTHER PUBLICATIONS

K.N. Plataniotis and A.N. Venetsanopoulos, "Color Image Processing andApplications", SpringerVerlag, Feb. 18, 2000 (Year: 2000).*
English machine translation of JP2015160282A (Year: 2015).*

(Continued)

*Primary Examiner* — Dominic J Bologna
(74) *Attorney, Agent, or Firm* — Womble Bond Dickinson (US) LLP

(57) ABSTRACT

A method for determining the degree of coverage of a metal part having undergone a treatment modifying the surface roughness of said part, characterised in that it comprises the following steps: —a step of determining a calibration function (C) of a parameter (L*) of the CIELAB colour space as a function of the degree of coverage, in such a way as to be able to link a given value of said parameter (L*) with the corresponding value of the degree of coverage, —a step of measuring the value of said parameter (L*) of the part, and—a step of determining the degree of coverage of said part by linking, using the calibrating function, the corre- (Continued)

sponding value of the degree of coverage of the part with the value of said parameter measured in this way (L*).

15 Claims, 3 Drawing Sheets

(51) Int. Cl.
    *G01N 21/25*     (2006.01)
    *G01N 21/27*     (2006.01)
    *G01N 21/47*     (2006.01)

(56) References Cited

OTHER PUBLICATIONS

Hill et al., "Comparative Analysis of the Quantization of Color Spaces on the Basis of the CIELAB Color-Difference Formula", ACM Transactions on Graphics, vol. 16, No. 2, Apr. 1997, pp. 109-154.

Ibraheem et al., "Understanding Color Models: A Review", ARPN Journal of Science and Technology, vol. 2, No. 3, Apr. 2012, pp. 265-275.

International Search Report received for PCT Patent Application No. PCT/EP2018/058754, dated Jun. 18, 2018, 7 pages (3 pages of English Translation and 4 pages of Original Document).

Vieira et al., "Application of computer vision methods to estimate the coverage of peen formed plates", Journal of Achievements in Materials and Manufacturing Engineering, vol. 43, No. 2, Dec. 2010, pp. 743-749.

\* cited by examiner

METHOD FOR DETERMINING THE DEGREE OF COVERAGE OF A METAL PART HAVING UNDERGONE A TREATMENT MODIFYING THE SURFACE ROUGHNESS OF SAID PART

TECHNICAL FIELD

The present invention has for subject matter a method for determining the degree of coverage of a metal part having undergone a treatment modifying the roughness of its surface, such as a shot-peening, a sandblasting or a machining. The method applies itself in particular to parts such as landing gear components (pistons, cylinders, etc.), or turbine engines (discs, vanes, spinning wheels, shafts, pinions, etc.).

STATE OF THE ART

The prestressing shot-peening (for example with a nozzle, a turbine, or with ultrasound) of a part is a method for mechanically reinforcing a surface involving a plastic deformation, and which improves the lifetime of the part. This is more specifically about projecting, at a great speed, steel, glass or ceramic balls, called shots, to the surface of the part. During the impact, each ball generates an indentation on the surface of the part. Under the action of the repeated peening of the balls, the surface, having exceeded the elasticity limit, undergoes a plastic deformation over a depth which varies between a few hundredths and several tenths of a millimetre, according to the intensity of the shot-peening and the hardness of the part, thus modifying the surface roughness.

In order that the shot-peening induces homogenous properties on the surface and sublayer, the surface must be fully covered by the impacts of balls. That is why controlling the degree of coverage of the part by indentations of balls is an essential parameter for controlling this method.

The degree of coverage is defined as being the ratio of the surface subjected to a plastic deformation (to the shot-peening) on the total surface to be treated, expressed as a percentage. The degree of coverage can be greater than 100%, when the shot-peening duration exceeds the duration required to obtain a degree of coverage of 100%. For example, a degree of coverage of 125% corresponds to a shot-peening duration equal to 1.25 times the duration required to achieve a full coverage. For certain critical zones of a part, a maximum coverage can be imposed, for example a maximum coverage of 400%.

According to internal or industrial specifications, like the standard SAE J2277, the coverage is a parameter which is evaluated using a magnifying glass or binocular having a magnification greater than or equal to ×10. This type of evaluation is carried out by the naked eye and is based on the visual acuity and the experience of the operator who carries out the inspection. In other words, for one same shot-peened zone, it is possible to have an evaluation that is different from one operator to another. In addition, the visual acuity of human beings does not make it possible to distinguish coverages greater than 98%, which corresponds to what the standard SAE J2277 considers as being a full coverage. According to the shot-peened material and its initial surface state, the evaluation of the coverage may be a non-trivial and expensive operation over time.

Different techniques are known from the state of the art which make it possible to determine the degree of coverage of a turbine engine part.

Document GB 1 468 008 describes a method consisting of depositing on the surface of a part, before shot-peening, a fluorescent liquid which can be revealed using an ultraviolet lamp. During the shot-peening, the different indentations locally chip off the paint and remove it from the surface of the part. However, the evaluation of the coverage is still based on a visual and subjective inspection by the operator.

Document JP 2011-152603 A describes a device provided with a means for capturing images and a software dedicated to their processing. This is about taking images of the shot-peened surface, binarizing them into a black and white image, then providing an estimation of the coverage. However, this device requires to be calibrated before each series of measuring. Indeed, the operator must take shots for different coverages and make the value given by the camera correspond to the actual coverage of the surface, based on an evaluation by the naked eye by the operator in advance. Despite the appearances, this method of measuring remains subjective and is still based on the visual acuity of the operator who must calibrate the images.

The present invention aims to remedy these disadvantages, by proposing a method for determining the degree of coverage of a metal part having undergone a treatment modifying the roughness of its surface, such as a shot-peening, a sandblasting, or a machining, the method being precise, non-invasive, and making it possible to avoid a visual inspection of the part.

SUMMARY OF THE INVENTION

The invention thus relates to a method for determining the degree of coverage of a metal part having undergone a treatment modifying the surface roughness of said part.

The method according to the invention comprises the following steps:
- a step of determining a calibration function a parameter of the CIELAB colour space as a function of the degree of coverage, in such a way as to be able to associate a given value of said parameter with the corresponding value of the degree of coverage,
- a step of measuring the value of said parameter of said part, and
- a step of determining the degree of coverage of said part, by associating, using the calibration function, to the value thus measured of said parameter, the corresponding value of the degree of coverage of the part.

Thus, using a CIELAB colour parameter to determine the degree of coverage of the part makes it possible to avoid a visual inspection of the part. The calibration function, characteristic of the part, furthermore, makes it possible for a precise determination of the degree of coverage.

Said at least one parameter of the CIELAB colour space can be selected from among the clarity $L^*$, the chromatic component from green to red $a^*$, and the chromatic component from blue to yellow $b^*$.

Said at least one parameter of the CIELAB colour space can be a colorimetric difference $\Delta E$ between two different surface states, defined by the relationship:

$$E_{2-1} = \Delta E = \sqrt{(L^*_2 - L^*_1)^2 + (a_2 - a^*_1)^2 + (b^*_2 - b^*_1)^2}$$

wherein $(L^*_1; a^*_1; b^*_1)$ and $(L^*_2; a^*_2; b^*_2)$ are the parameters of the CIELAB colour space for two different surface states.

The determination of a calibration function of said at least one parameter of the CIELAB colour space as a function of the degree of coverage can be achieved by measuring the value of a parameter of the CIELAB colour space for different values of degree of coverage of a calibration part.

The different values of degree of coverage of the calibration part advantageously belong to a predetermined interval, the predetermined interval comprising, in particular, the degree of coverage to be determined.

The predetermined interval of degree of coverage can comprise values less than 100%.

The predetermined interval of degree of coverage can comprise values greater than 100%. The predetermined interval of degree of coverage can in particular comprises values greater than 400%.

The method can further comprise a step of characterising the nature of the material of the part, by comparing the calibration function with at least one calibration function characteristic of a given material.

The method can further comprise a step of characterising the surface state of the part, by comparing the value of said parameter, for a given degree of coverage, with at least one value of said parameter, characteristic of a given surface state, for the same given degree of coverage.

The treatment modifying the surface roughness of said part can be a shot-peening, a sandblasting or a machining.

Said part can be an aircraft landing gear part or a turbine engine part.

DESCRIPTION OF THE FIGURES

The invention will be better understood and other details, features and advantages of the invention will appear upon reading the following description, made as a non-limiting example and in reference to the appended drawings, wherein.

DETAILED DESCRIPTION

Three parameters are necessary and sufficient to define a colour. Therefore, all of the colours can be represented in a three-dimensional marking.

A colorimetric space designates the geometric volume corresponding to a set of colours available in a colorimetric system. The colorimetric model notion makes reference to the different manners in which the numbers will be used to describe a colour, but also the manner of carrying out the colour mixtures. A colorimetric model is a type of generic classification of the colorimetric space families.

Figure 1:
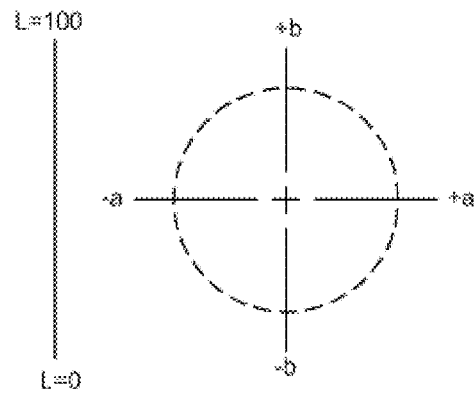
FIGS. 1 and 2 are diagrams illustrating a CIELAB colorimetric space.
Figure 2:
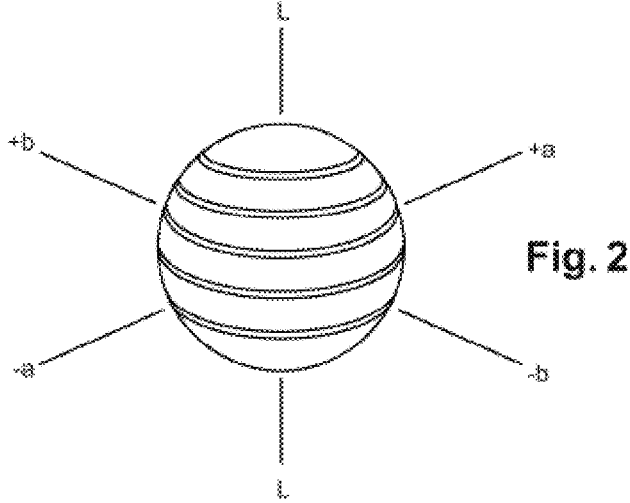

The CIELAB model (or CIE LAB, or also CIE L*a*b*), has been adopted by the CIE (Commission Internationale de l'Eclairage-International Commission on Illumination) in 1976. It models the human vision and is independent of any material. The CIELAB colorimetric space is illustrated in FIGS. 1 and 2.

The component L* is the clarity, which goes from 0 (black) to 100 (white). The clarity represents the luminosity of a surface. A very luminous surface has a high clarity whereas a perfectly black surface has a zero clarity. The parameters (L*a*b*) constitute the parameter space which define and limit the colorimetric measurement, and this according to the definition of the CIE LAB space by the Commission Internationale de l'Eclairage-International Commission on Illumination (CIE). In the colours marking a*b*, the increase of the values of a* and b* indicates an increase of the saturation of the colours.

The component a* is a chromatic component from green to red. It represents a range of 600 levels on a green (−300)→red (+299) axis.

The component b* is the chromatic component from blue to yellow. It represents a range of 600 levels on a blue (−300)→yellow (+299) axis.

Figure 3:
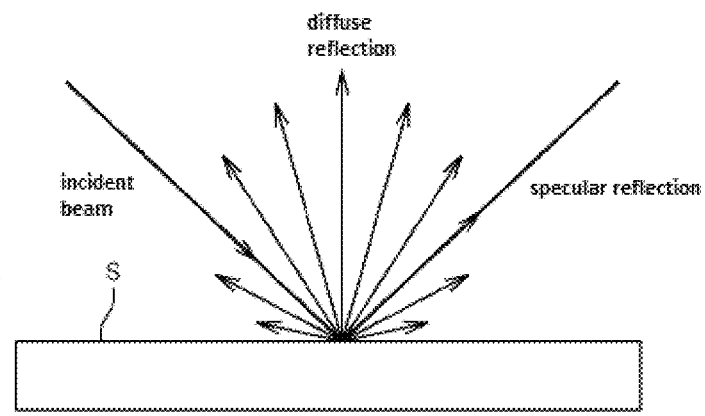
FIG. 3 schematically illustrates the reflection of light on a surface.

The reflection of light on a surface S is generally a mixture of two reflection methods: a diffuse reflection and a specular reflection (FIG. 3). A surface is said shiny if the reflection is mainly specular, semi-matt if the specular reflection is weak or "complex" if the light is randomly reflected and diffused. The incident beam which is used to illuminate the surface in order to carry out a colorimetric measurement typically forms an angle of 5° to 15° with the normal to the surface S, for example an angle of 10°.

The colorimetric difference (ΔE) between two different surface states, in the space of the values L*a*b*, is defined by the relation:

$$E_{2-1} = \Delta E = \sqrt{(L^*_2 - L^*_1)^2 + (a^*_2 - a^*_1)^2 + (b^*_2 - b^*_1)^2}$$

$(L^*_1; a^*_1, b^*_1)$ and $(L^*_2; a^*_2, b^*_2)$ being the parameters of the CIELAB colour space for two different surface states, like for example a state before and after shot-peening, or also two different degrees of coverage.

Figure 4:
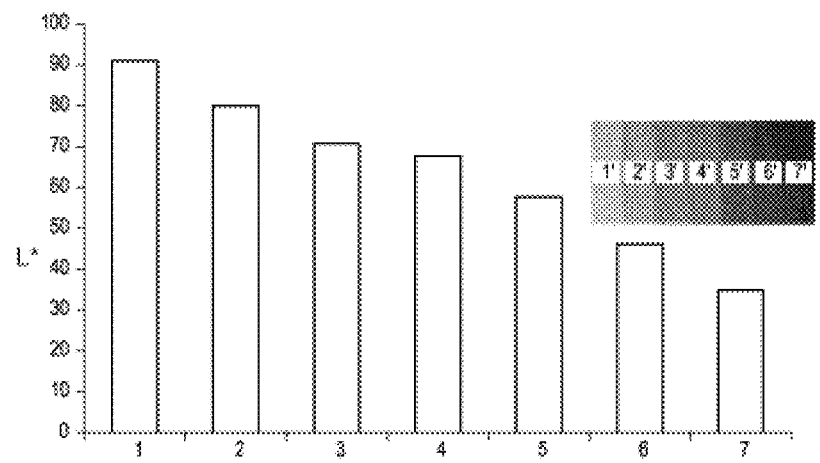
FIG. 4 is a diagram showing the evolution of the clarity L* of a surface for different degrees of coverage.

The invention is based on the fact that, when a surface is shot-peened, the indentations of balls modify the topography of the surface. This surface modification, with respect to a reference state (before shot-peening, for example), influences the manner in which the light is reflected by the surface. FIG. 4 shows the evolution of the clarity L* of a surface for different degrees of coverage 1 to 7, the degree of coverage 1 being the lowest and the degree of coverage 7 being the greatest. This is represented by a decrease of the clarity L* with the increase of the degree of coverage. Furthermore, it is visually observed that the more a surface is shot-peened, the more it appears matt. The portion at the top-right of FIG. 4 shows the visual states 1' to 7' of the part corresponding to the degrees of coverage 1 to 7. The change in the surface topography can also affect the colour perceived, namely the parameters a* and b*.

The method according to the invention makes it possible to determine the degree of coverage of a turbine engine part subjected to a plastic deformation, like for example a shot-peening or a sandblasting.

The method comprises the determination of a calibration function (or calibration curve) of a parameter of the CIELAB colour space as a function of the degree of coverage of a calibration part, and in particular for a given interval of degree of coverage.

To determine this calibration curve, measuring the value of the parameter for several values of the degree of coverage of the part is proceeded with.

Figure 5:
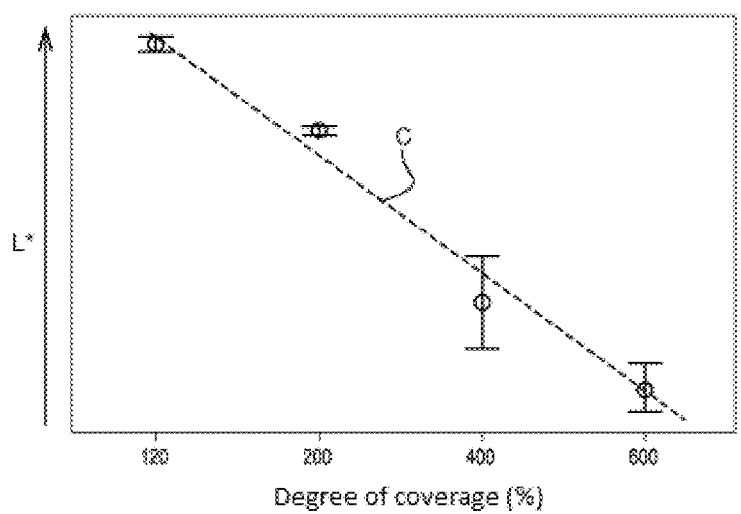
FIG. 5 is a diagram illustrating the formation of a calibration function for a measurement according to the invention, according to a first embodiment.

As an example, stainless steel tubes, of austenitic stainless steel type (AISI) 316L, are subjected to a mirror polishing. The mirror polishing is a finishing which requires removing all of the defects and carrying out a perfect shiny polishing. The tubes are shot-peened at different degrees of coverage, in this example, at 120%, 200%, 400% and 600%, therefore on the interval going from 120% to 600%. The parameter of the CIELAB colour space selected is the clarity L*. The value of the clarity L* is measured for each degree of coverage (FIG. 5).

The calibration curve C is determined by extrapolation, for example by linear regression (typically by the method of least squares).

Once the calibration curve C is obtained, it is known to associate with a given clarity value L*, the corresponding value of the degree of coverage. Thus, all that is needed, for a part subjected to a shot-peening, is to measure the value of the parameter (for example, the clarity L* as illustrated in FIG. 5) of the part, and to deduce from it the corresponding degree of coverage using the calibration curve.

The clarity L* is a particularly effective parameter to determine the degree of coverage. However, the chromatic components a* and b* can also be used as a parameter.

Figure 6:
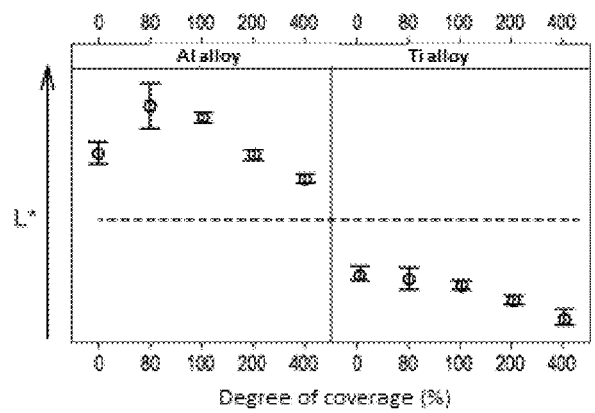
FIG. 6 is a diagram illustrating the formation of a calibration function for a measurement according to the invention, according to a second and to a third embodiment.

In the example illustrated in FIG. 6, two types of alloys have been tested, namely an aluminium-based alloy on the left-hand portion of FIG. 6, and a titanium-based alloy on the right-hand portion of FIG. 6. The aluminium-based alloy is the alloy 2024-T3, and the titanium-based alloy is the alloy Ti-6Al-4V (designated under the reference R56400 in the UNS system).

Tubes machined from these two alloys have been shot-peened at degrees of coverage of 0%, 80%, 100%, 200% and 400%, that is on the interval of degree of coverage going from 0% to 400%. On non-polished (machined) surfaces, the colorimetric measurements prove to be effective to quantify the coverage. The parameter of the CIELAB colour space selected is the clarity L*. It is observed that the clarity L* overall decreases with the degree of coverage.

Like for the example illustrated in FIG. 5, the calibration curve is completed by extrapolation in such a way so as to be able to associate with a given clarity value L*, the corresponding value of the degree of coverage.

It is observed that the ranges of values of the clarity L* are different for each alloy, which also makes it possible to characterise a type of alloy by its calibration curve.

Figure 7:
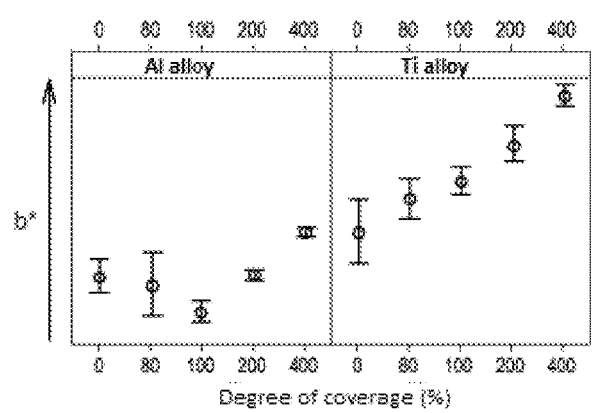
FIG. 7 is a diagram illustrating the formation of a calibration function for a measurement according to the invention, according to a fourth and to a fifth embodiment.

In a variant, the tubes of FIG. 6 have been tested with another parameter of the CIELAB colour space: the chromatic component from blue to yellow b* (FIG. 7). This time, it is observed that the chromatic component b* overall increases with the degree of coverage. Again, it is observed that the ranges of values of the chromatic component b* are different for each alloy, which also makes it possible to characterise a type of alloy by its calibration curve.

Figure 8:
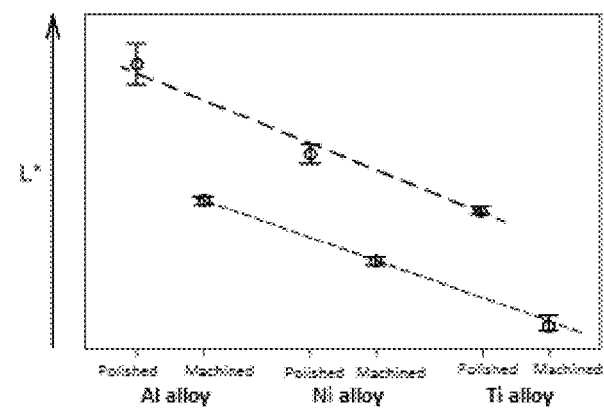
FIG. 8 is a diagram illustrating the characterisation of a surface state, according to a variant of the measurement according to the invention.

In another embodiment, illustrated in FIG. 8, three metal alloys have been tested, for a given degree of coverage, with for each family, a polished surface state and a machined (by rectification) surface state. The parameter of the CIELAB colour space selected is the clarity L*. The degree of coverage is 0%, i.e. that the tubes have not been subjected to shot-peening. The tested alloys are an aluminium-based alloy, a nickel-based alloy and a titanium-based alloy. The aluminium-based alloy is the alloy 2024-T3, the nickel-based alloy is the alloy Inconel® 718 commercialised by the company Special Metals Corporation, and the titanium-based alloy is the alloy Ti-6Al-4V (designated under the reference R56400 in the UNS system).

It is observed that the clarity varies according to the alloy used, but also according to the surface state (polished or machined). The parameter of the colour space therefore also makes it possible to characterise both the type of alloy and the surface state.

The invention claimed is:

1. Method for determining the degree of coverage of a metal part having undergone a treatment modifying the surface roughness of said metal part, wherein said method comprises the following steps:

a step of determining a calibration function (C) of at least one parameter of a CIELAB colour space as a function of the degree of coverage, in such a way as to be able to associate a given value of said at least one parameter with the corresponding value of the degree of coverage, wherein said at least on parameter is one of L*, a*, b*, ΔE of the CIELAB colour space, a step of measuring the value of said at least one parameter of said metal part, and a step of determining the degree of coverage of said metal part, by associating, using the calibration function (C), to the determined value of said at least one parameter, the corresponding value of the degree of coverage of the metal part, wherein said step of determining the calibration function (C) is achieved by measuring a value of said at least one parameter of the CIELAB colour space for different values of degree of coverage of a calibration part which belong to a predetermined interval, and wherein the predetermined interval of said different values of degree of coverage comprises values greater than 100%.

2. Method according to claim 1, wherein said at least one parameter of the CIELAB colour space is selected from among the clarity parameter L*, the chromatic component parameter from green to red a*, and the chromatic component parameter from blue to yellow b*.

3. Method according to claim 2, wherein a second one of said at least one parameter of the CIELAB colour space is a colorimetric difference ΔE between two different surface states, defined by the relationship:

$$E_{2-1} = \Delta E = \sqrt{(L^*_2 - L^*_1)^2 + (a^*_2 - a^*_1)^2 + (b^*_2 - b^*_1)^2}$$

wherein $(L^*_1; a^*_1, b^*_1)$ and $(L^*_2; a^*_2, b^*_2)$ are the parameters of the CIELAB colour space for two different surface states.

4. Method according to claim 3, wherein said two different surface states are a state before the treatment modifying the surface roughness of said metal part and a state after said treatment modifying the surface roughness of said metal part.

5. Method according to claim 2, when said at least one parameter of the CIELAB colour space is the clarity parameter L*, the clarity L* decreases with the increase of the degree of the coverage in said calibration function (C) of the clarity parameter L*.

6. Method according to claim 2, when said at least one parameter of the CIELAB colour space is the chromatic component from green to red a*, the chromatic component from green to red a* increases with the increase of the degree of the coverage in said calibration function (C) of the chromatic component from green to red a*.

7. Method according to claim 2, when said at least one parameter of the CIELAB colour space is the chromatic component from blue to yellow b*, the chromatic component from green to red b* increases with the increase of the degree of the coverage in said calibration function (C) of the chromatic component from blue to yellow b*.

8. Method according to claim 1, wherein the predetermined interval of the degree of coverage comprises values greater than 400%.

9. Method according to claim 1, wherein the method further comprises a step of characterising the nature of the material of the metal part, by comparing the calibration function with at least one calibration function characteristic of a given material.

10. Method according to claim 1, wherein the method further comprises a step of characterising the surface state of the metal part, by comparing the value of said at least one parameter for a given degree of coverage, with at least one value of said at least one parameter characteristic of a given surface state, for the same given degree of coverage.

11. Method according to claim 1, wherein the treatment modifying the surface roughness of said metal part is a shot-peening, a sandblasting or a machining.

12. Method according to claim 1, wherein said metal part is an aircraft landing gear part or a turbine engine part.

13. Method according to claim 1, wherein said calibration part are stainless steel test tubes.

14. Method according to claim 13, wherein said stainless steel test tubes are subjected to a mirror polishing, then said stainless steel test tubes are shot-peened at different degrees of coverage, then the value of said at least one parameter of the CIELAB colour space is measured for each of said different degrees of coverage, and a curve of said calibration function (C) is determined by extrapolation.

15. Method according to claim 13, wherein said value of said at least one parameter of the CIELAB colour space is measured on an interval from 120% to 600% of degree of coverage.

* * * * *